United States Patent [19]

Laue

[11] Patent Number: 4,678,939
[45] Date of Patent: Jul. 7, 1987

[54] OUTPUT CIRCUIT FOR SIGNAL TRANSMISSION SYSTEMS

[75] Inventor: Hans-Bodo Laue, Altenbeken, Fed. Rep. of Germany

[73] Assignee: Nixdorf Computer AG, Paderborn, Fed. Rep. of Germany

[21] Appl. No.: 765,735

[22] Filed: Aug. 14, 1985

[30] Foreign Application Priority Data

Aug. 17, 1984 [DE] Fed. Rep. of Germany ....... 3430338

[51] Int. Cl.$^4$ ...................... H03K 19/20; H03K 3/26; H03K 19/14
[52] U.S. Cl. .................................... 307/445; 307/270; 307/311
[58] Field of Search ................. 307/255, 311, 270, 445

[56] References Cited

U.S. PATENT DOCUMENTS 3,842,259 10/1974 Bruning ............................... 307/311
4,121,203 10/1978 Edwards et al. ..................... 307/270
4,345,164 8/1982 Gies ..................................... 307/255
4,408,131 10/1983 Fox ..................................... 307/311

Primary Examiner—Stanley D. Miller
Assistant Examiner—B. P. Davis
Attorney, Agent, or Firm—Cullen, Sloman, Cantor, Grauer, Scott & Rutherford

[57] ABSTRACT

In an output circuit for a signal transmission system to generate a bipolar output signal, a power output stage (62) is driven by a data signal and a transmitter release signal via an isolation stage (18) and a logic network (64). The power output stage comprises two complementary transistors whose bases are each separately driven from an output (50, 56) of the logic network (64) so that only one of the two transistors (54, 60) is switched to conducting in the presence of a transmitter release signal corresponding to the polarity of the output signal to be produced and so that both transistors (54, 60) are closed, independent of the data signal, in the absence of a transmitter release signal.

3 Claims, 2 Drawing Figures

| | | (22) NOR- | | | (30) | | | (40) | | | (44) | | |
|---|---|---|---|---|---|---|---|---|---|---|---|---|---|
| (10) | (12) | 1. (20) | 2. (24) | (26) | 1. (28) | 2. (32) | (36) | 1. (38) | 2. (46) | (50) | 1. (42) | 2. (48) | (56) |
| I | L | H | L | L | H | H | H | L | L | H | L | L | L | H |
| II | H | H | H | L | L | L | H | L | L | H | L | L | L | H |
| III | L | L | L | L | H | H | L | L | L | L | H | L | L | H |
| IV | H | L | H | L | L | L | L | H | H | L | L | H | L | L |

FIG. 2

OUTPUT CIRCUIT FOR SIGNAL TRANSMISSION SYSTEMS

TECHNICAL FIELD

The present invention concerns an output circuit for signal transmission systems to produce a bipolar, transmission-ready output signal by driving a power output stage with a data signal and a transmitter release signal via an isolating stage and a logic network whereby the output of the power output stage is switched to high resistance in the absence of a transmitter release signal.

BACKGROUND ART

An output circuit of the general type with which this invention is concerned is shown in FIG. 10.3.2-3 of a Hewlett-Packard publication "Optoelectronics, Fiberoptics Application Manual", 1981. In this prior output network a data signal is connected to a first optical coupler on the operating side via a NAND element, to which it is logically connected via a transmitter release signal. This logical coupling of the data signal to the transmitter release signal is undertaken only so that the light emitting diode of this first optical coupler is turned on only when the transmitter is released for transmitting. Thus, an unnecessary deterioration of the optical coupler light emitting diode can be avoided. The data signal is electrically isolated from the operating side by the optical coupler and connected to the transmitter, where it drives a power output stage. This is implemented in the form of an integrated circuit. It has two outputs by which a ground symmetric output signal can be released. Both outputs can be simultaneously switched to high resistance via a second input of the power output stage. This second input of the power output stage is driven by the transmitter release signal via an operating side negation element and a second optical coupler. This second optical coupler electrically isolates the operating side transmitter release signal from the line side of the transmitter. In this known output network, a line driving component of comparatively complicated construction is used as a power output stage. The line driving component also contains the complete driver logic circuitry; thus, in the event of a defect, the entire, comparatively expensive, line driver component must be exchanged.

SUMMARY OF THE INVENTION

It is therefore an object of this invention to provide a more simple and thus more economical power output stage of an output circuit for signal transmission systems.

The present invention solves this problem by providing a power output stage which comprises two complementary transistors whose bases are each separately driven from an output of the logic circuit so that only one of the two transistors is switched to conducting in the presence of a transmitter release signal corresponding to the polarity of the output signal to be produced, and that both transistors are switched closed, independent of the data signal in the absence of a transmitter release signal.

The present power output stage is distinguished by its unusually simple construction, since it is constructed from only two complementary transistors. The bipolar output signal can be generated on only one pole of the power output stage's output. In contrast to the customary output circuit where only a different signal is produced at the output, its second output pole is then identical to the neutral terminal of a line side transmitter supply voltage.

In the preferred embodiment, the emitters of the two complementary transistors are connected to the transmission line of the signal transmission system via a common resistance. Therefore, their collectors are biased by the line side transmitter supply voltage so that the collector of the npn-transistor lies on the positive supply voltage and the collector of the pnp-transistor lies on the negative supply voltage. For example, if the bases of both complementary transistors are driven with positive supply voltage, the npn-transistors are driven with positive supply voltage, and the npn-transistor is switched to conducting whereas the pnp-transistor is closed. Thus the positive line side supply voltage is applied as signal voltage to the transmission line via the conducting npn-transistor and the resistance common to both transistors. Conversely, if both bases of the complementary transistors are driven with negative voltage, then the npn-transistor is closed, and the pnp-transistor is switched to conducting. In this case the negative line side transmitter supply voltage is applied as signal voltage to the transmission line via the open pnp-transistor and the resistance common to the two transistors. Conversely if the base of the npn-transistor is driven with negative voltage, while the base of the pnp-transistor is simultaneously driven with positive voltage, then the two transistors are simultaneously closed. Consequently, the output of the power output stage is at high resistance. The bases of the two transistors are driven by the data signal and the transmitter release signal via the logic circuit and the isolating stage.

In a further refinement of the output network, the logic circuit includes a first and a second logic element, whereby the first logic element receives the transmitter release signal and the data signal as input signals and with its output signal biases both input of the second logic element and drives the base of the one transistor, and whereby the second logic element receives the transmitter release signal as a second input signal and drives the base of the other transistor with its output signal. The two logic elements suffice to combine the data signal and the transmitter release signal so that both bases of the two transistors are driven so that both positive line side transmitter supply voltage and negative line side supply voltage can be applied as signal voltage to the transmission line; and, furthermore, the transmitter can be switched to high resistance.

In an advantageous refinement, the logic circuit is constructed from four logic elements. The first logic element is driven via a third logic element by the data signal, whereby the second input of the third logic element is biased by the line side transmitter supply voltage. In addition, the first logic element drives the base of the one transistor via a fourth logic element, whose second input is biased by the line side transmitter supply voltage. It is advantageous to drive the bases of the transistors in this manner so that in case of failure of the line side transmitter supply voltage and/or failure of the isolation stage for the transmitter release signal, the transmitter output is at high resistance; and, thus, the data transmissions of other networks connected to the transmission system are not disturbed. The linkage of the data signal and the transmitter release signal to the line side transmitter supply voltage also has the effect that data transmission (of other senders and receivers connected to the system) are not disturbed at high levels of line side transmitter supply voltage if the optical coupler light emitting diode which couples the transmitter release signal remains switched off.

Using NOR gates elements in C-MOS technology as logic elements is preferred. They are driven with low level line signals, thus in negative logic. This means that the indicator level L (LOW) corresponds to the logical condition 1 and the indicator level H (HIGH) corresponds to the logical condition 0. This correspondence applies also to the illustrated embodiment of the invention which is described later herein. NOR elements in C-MOS technology have the advantage that their output stages switch the supply voltages to the bases of the transistors with particularly low residual voltage. They can be housed in a casing without taking up much space. Parallel driving of the second and fourth NOR gate logic elements guarantees equal signal traverse times. Thus, it is assured that both transistors of the power output stage do not simultaneously conduct and do not cause transfer distortions. Only by this measure can the protective resistances which are otherwise connected between the emitters of both transistors, be eliminated.

BRIEF DESCRIPTION OF THE DRAWINGS

FIG. 2 is a logic chart which reproduces the signal flow of the output circuit in FIG. 1 for the different transmitter input signals.

DESCRIPTION OF THE PREFERRED EMBODIMENT

Figure 1:
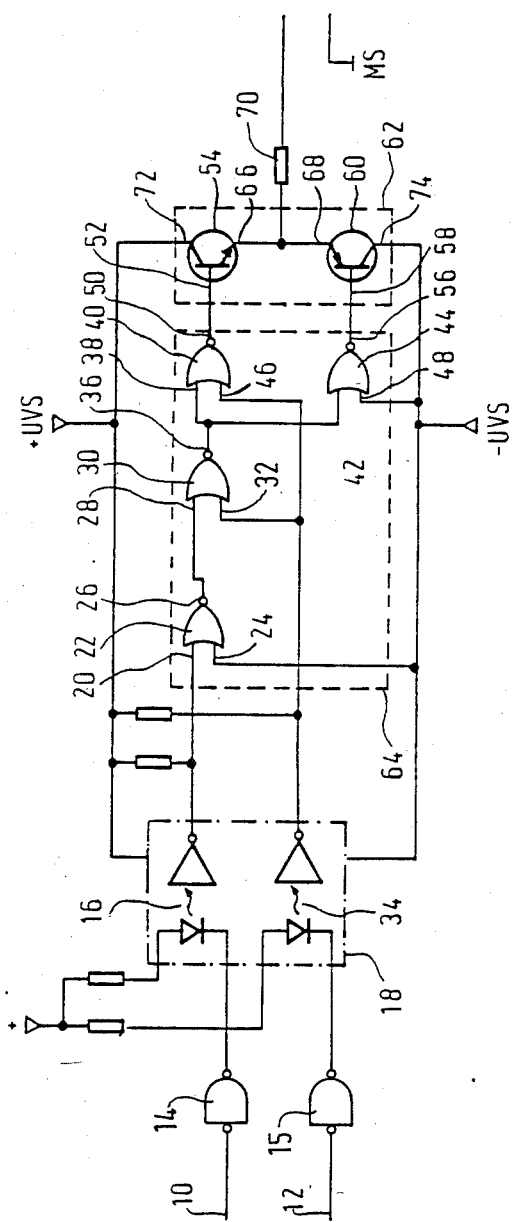
FIG. 1 is a detailed schematic circuit diagram of one embodiment of an output circuit for signal transmission systems.

Referring to the drawings, the output circuit for the signal transmission system of FIG. 1 has a first input 10 to introduce the data signal and a second input 12 to introduce the transmitter release signal. Both inputs have non-inverting drivers 14 and 15. The data signal biases a first input 20 of a first NOR logic element 22 via a first optical coupler 16 of optical coupler configuration 18. The second input of the NOR logic element 22 is biased by a negative line side transmitter supply voltage −UVS. The output 26 of the first NOR logic element 22 is connected to a first input 28 of a second NOR logic element 30. The second input 32 of the second NOR logic element 30 is driven by the transmitter release signal via a second optical coupler 34 of optical coupler configuration 18. Output 36 of the second NOR logic element 30 is connected to a first input 38 of a third NOR logic element 40 as well as to a first input 42 of a fourth NOR logic element 44. Whereas the second input 46 of the third NOR logic element 40 is driven with the transmitter release signal, the second input 48 of the fourth NOR logic element 44 is biased by the negative line side transmitter supply voltage −UVS. Output 50 of the third NOR logic element 40 drives the base 52 of an npn-transistor 54. Output 56 of the fourth NOR logic element 44 is connected to the base 58 of a pnp-transistor 60. Both transistors 54 and 60 together comprise the power output stage 62, which is driven by the logic circuit 64 composed of the four NOR elements. Emitters 66 and 68 of both transistors 54 and 60 are connected to a first lead of a signal transmission system's transmission line (not shown) via a common resistance 70. Thus, the second lead of the transmission line is connected to the neutral point MS of the line side transmitter supply voltage ±UVS. Whereas collector 72 of the npn-transistor 54 is connected to the positive line side transmitter supply voltage +UVS, collector 74 of the pnp-transistor 60 is biased by the negative line side transmitter supply voltage −UVS.

The following describes the manner of operation of the output circuit of FIG. 1 and with the aid of te logic chart of FIG. 2 in conjunction with the circuit diagram of the output circuit of FIG. 1.

The indicator levels of the two inputs and the output of the four NOR gate elements, (driven in negative logic) and of the line indicator on the transmitter output, are portrayed in the logic chart depending on the indicator levels of the transmitter input signals; that is, of the data signal and the transmitter release signal. These level indicators are characterized by the notation H and L, depending on whether the voltage is greater than a prescribed value of $U_H$ or smaller than a prescribed value of $U_L$ ($U_L < U_H$). If the voltage is greater than $U_H$, then it is at indicator level H (HIGH); conversely, if it is smaller than $U_L$, it is at indicator level L (LOW).

The Columns I and II of the logic chart show the indicator levels in the output circuit when the transmitter is switched off (transmitter release signal indicator level H); on the other hand, columns III and IV show the indicator levels when the transmitter is switched on (transmitter release signal indicator level L). For example, if as may be seen from column I of the indicator chart when the transmitter is shut off (transmitter release signal indicator level H), a level L is indicated at the data signal input, then the first input 20 of the first NOR gate 22 receives a level L via the non-inverting driver 14 and the first optical coupler 16. The second input 24 of the first NOR gate (22) is biased by the negative line side transmitter supply voltage −UVS at level L, so that a level H is present on output 26 of this first NOR gate 22, with which the first input 28 of second NOR gate 30 is driven. The second input 32 of the second NOR gate 30 is admitted at level H by the transmitter release signal (transmitter input 12) via the second non-inverting driver 15 and the second optical coupler 34, so that a level L is produced on output 36 of the second NOR gate 30, which is applied both to the first input 38 of the third NOR gate 40 and also the first input 42 of the fourth NOR gate 44. Since the second input 46 of the third NOR gate 40 is biased at a level H by the transmitter release signal (input 12) via the second non-inverting driver 15 and the second optical coupler 34, one obtains (corresponding to the NOR coupling) a level L at output 50 of the third NOR gate 40, which drives the base of the npn-transistor 54 and switches it closed. The fourth NOR logic element 44 is admitted at a level L on its second input 48 by the negative line side supply voltage −UVS so that a level H results on its output 56, which drives the base of the pnp-transistor 60 and switches it closed. Therefore, it can be determined that both transistors 54 and 60 of the power output stage 62 are switched closed when the transmitter is switched off (transmitter release signal indicator level H) and that a level L is applied at the data signal input. If both transistors 54 and 60 are switched closed, then neither the positive nor the negative line side transmitter supply voltage is applied to the transmitter output as signal voltage; in this case, the transmitter output is at high resistance.

Column II of the logic chart displays the signal flow of the transmission circuit in the case where the data signal input 10 is at level H and the transmitter is switched off (transmitter release signal indicator level H). As can be seen from FIG. 2 in conjunction with FIG. 1, also in this instance, the base of the npn-transistor 54 is driven at level L from the output 50 of the third NOR gate 40, and the base of the pnp-transistor 60 is driven at level H from the output 56 of the fourth NOR gate 44, so that both transistors 54 and 60 are switched closed; and, thus, the transmitter output is at high resistance.

The following considers the indicator levels in the output network appearing columns III and IV of the logic chart for the transmitter switched on (transmitter release signal indicator level L).

In the instance where the data signal input 10 of the transmitter is driven at a level L (column III), the npn-transistor 54 is switched to conducting due to the level H at the output 50 of the third NOR gate 40, whereas the pnp-transistor 60 is switched closed due to the level H at the output 56 of the fourth NOR gate 44. The positive line side transmitter supply voltage +UVS is delivered via the conducting npn-transistor 54 to the transmitter output as signal voltage.

On the other hand, if the data signal input 10 is driven at level H with the transmitter switched on (transmitter release signal indicator level L), then the npn-transistor 54 is switched closed due to the level L at the output 50 of the third NOR gate 40, whereas the pnp-transistor 60 is switched to conducting due to the level L at the output 56 of the fourth NOR gate 44. The negative line side transmitter supply voltage −UVS is delivered via this conducting pnp-transistor 60 to the transmitter output as signal voltage.

In summary, the output circuit functions so that the transmitter output with the transmitter switched off is at high resistance independent of the data signal, and so that the line indicator at the transmitter output depending on the data signal, will be positive when the transmitter is switched on negative.

What is claimed is:

1. In an improved circuit for signal transmission systems employed to generate a bipolar, transmission-ready transmit signal for delivery to a signal transmission line of a signal transmission system, by driving a power output stage by a data signal and a transmitter release signal via an isolation stage and a logic circuit, whereby the output of the power stage is switched to low resistance in the presence of said transmitter release signal and to high resistance in the absence of said transmitter release signal, the improvement wherein the power output stage (62) is composed of two complementary transistors (54, 60), each of said transistors (54, 60) including a base (52, 58), a collector (72, 74) and an emitter (66, 68), said emitters (66, 68) being connected to a signal transmission line through a common resistor (70), said bases (52, 58) being each separately controlled from and directly connected to an output (50, 56) of the logic circuit (64) so that only one of the two transistors (54, 60) is switched to conducting in the presence of a transmitter release signal corresponding to the polarity of the output signal to be produced, and that both transistors (54, 60) are switched off, independent of the data signal in the absence of a transmitter release signal, and wherein the logic circuit (64) contains a first and second logic element (30, 40) receiving first and second input signals, the first logic element (30) receiving the transmitter release signal and the data signal as the first input signals, the output signal of the first logic element (30) driving both an input (38) of the second logic element (40) and the base of one of the transistors (60), and the second logic element (40) receiving the transmitter release signal as the second input signal and driving the base (52) of the other transistor (54) with its output signal, the first logic element (30) being driven with the data signal via a third logic element (22), an input (24) of the third logic element (22) being driven by a line side supply voltage.

2. The improved output circuit recited in claim 1, wherein the first logic element (30) drives the base (58) of said one transistor (60) via a fourth logic element (44) having a second input (48) driven by the line supply voltage.

3. In an improved circuit for signal transmission systems employed to generate a bipolar, transmission-ready transmit signal for delivery to a signal transmission line of a signal transmission system, by driving a power output stage by a data signal and a transmitter release signal via an isolation stage and a logic circuit, whereby the output of the power stage is switched to low resistance in the presence of said transmitter release signal and to high resistance in the absence of said transmitter release signal, the improvement wherein the power output stage (62) is composed of two complementary transistors (54, 60), each of said transistors (54, 60) including a base (52, 58), a collector (72, 74) and an emitter (66, 68), said emitters (66, 68) being connected to the signal transmission line through a common resistor (70), said bases (52, 58) being each separately controlled from and directly connected to an output (50, 66) of the logic circuit (64) so that only one of the two transistors (54, 60) is switched to conducting in the presence of a transmitter release signal corresponding to the polarity of the output signal to be produced, and that both transistors (54, 60) are switched off, independent of the data signal in the absence of the transmitter release signal, and wherein the logic circuit (64) contains a first and second NOR gate (30, 40) receiving first and second input signals, the first NOR gate (30) receiving the transmitter release signal and the data signal as the first input signals, the output signal of the first NOR gate (30) driving both an input (38) of the second NOR gate (40) and the base of one of the transistors (60), and the second NOR gate (40) receiving the transmitter release signal as the second input signal and driving the base (52) of the other transistor (54) with its output signal.

* * * * *